(12) United States Patent
Lin

(10) Patent No.: US 6,880,578 B2
(45) Date of Patent: Apr. 19, 2005

(54) PRESSURE-STABLE CYLINDER

(76) Inventor: Mao Chang Lin, 235 Chung-Ho Box 8-24, Taipei (TW)

( * ) Notice: Subject to any disclaimer, the term of this patent is extended or adjusted under 35 U.S.C. 154(b) by 105 days.

(21) Appl. No.: 10/384,239

(22) Filed: Mar. 11, 2003

(65) Prior Publication Data

US 2004/0178206 A1 Sep. 16, 2004

(51) Int. Cl.$^7$ .................................................. F16L 55/04
(52) U.S. Cl. .............................. 138/31; 138/30; 138/26; 220/721
(58) Field of Search .............................. 138/30, 31, 26; 220/721, 720, 227

(56) References Cited

U.S. PATENT DOCUMENTS

| | | | | |
|---|---|---|---|---|
| 4,691,739 A | * | 9/1987 | Gooden | 138/31 |
| 4,880,135 A | * | 11/1989 | Neou | 220/721 |
| 5,425,573 A | * | 6/1995 | Mirlocca | 303/87 |
| 5,771,936 A | * | 6/1998 | Sasaki et al. | 138/31 |
| 6,363,719 B1 | * | 4/2002 | Mohr et al. | 60/414 |
| 6,478,051 B1 | * | 11/2002 | Drumm et al. | 138/30 |
| 2004/0129325 A1 | * | 7/2004 | Bleeck et al. | 138/30 |

* cited by examiner

Primary Examiner—Patrick Brinson

(57) ABSTRACT

A pressure-stable cylinder comprises a cover having a dome shape groove and a through hole; an inner wall of the dome shape groove having threads; a cylinder having an opening and an opening section around the opening having a threaded tapered shape matching to the dome shape groove of the cover; the opening section of the cylinder being formed with a plurality of first washers; one end of the opening section having a coupling groove and a second washer; a bellow coupled to the second washer; a disk placed below the bellow; and a compressible spring placed between the disk and a bottom of the cylinder; the compressible spring resisting against the disk so that the cylinder has a predetermined pressure. In assembly, the washer and the bellow are steadily fixed to the coupling groove of the cylinder. The washers have an effect of draining-proof and air-tightness.

4 Claims, 8 Drawing Sheets

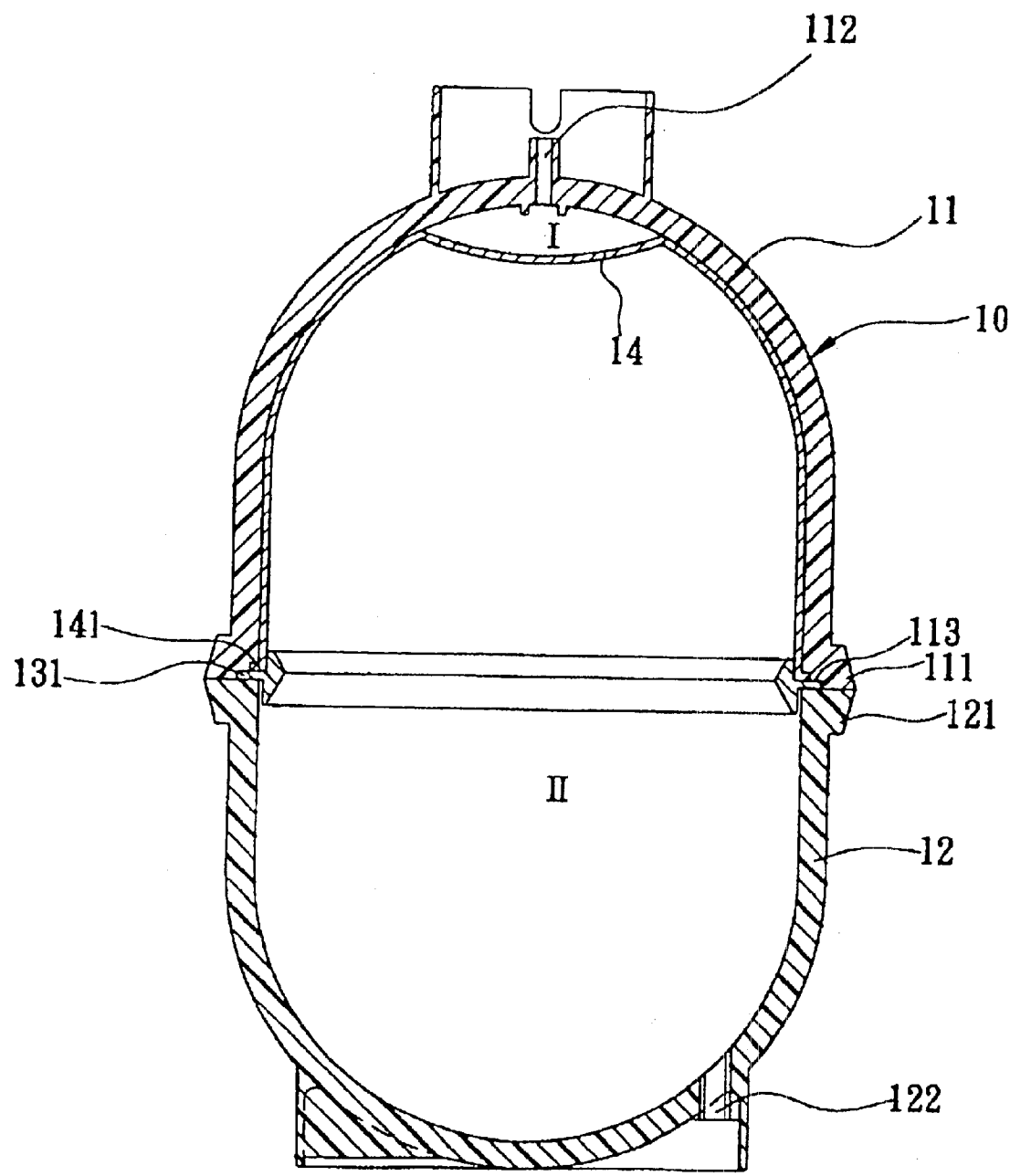
(PRIOR ART) FIG.2

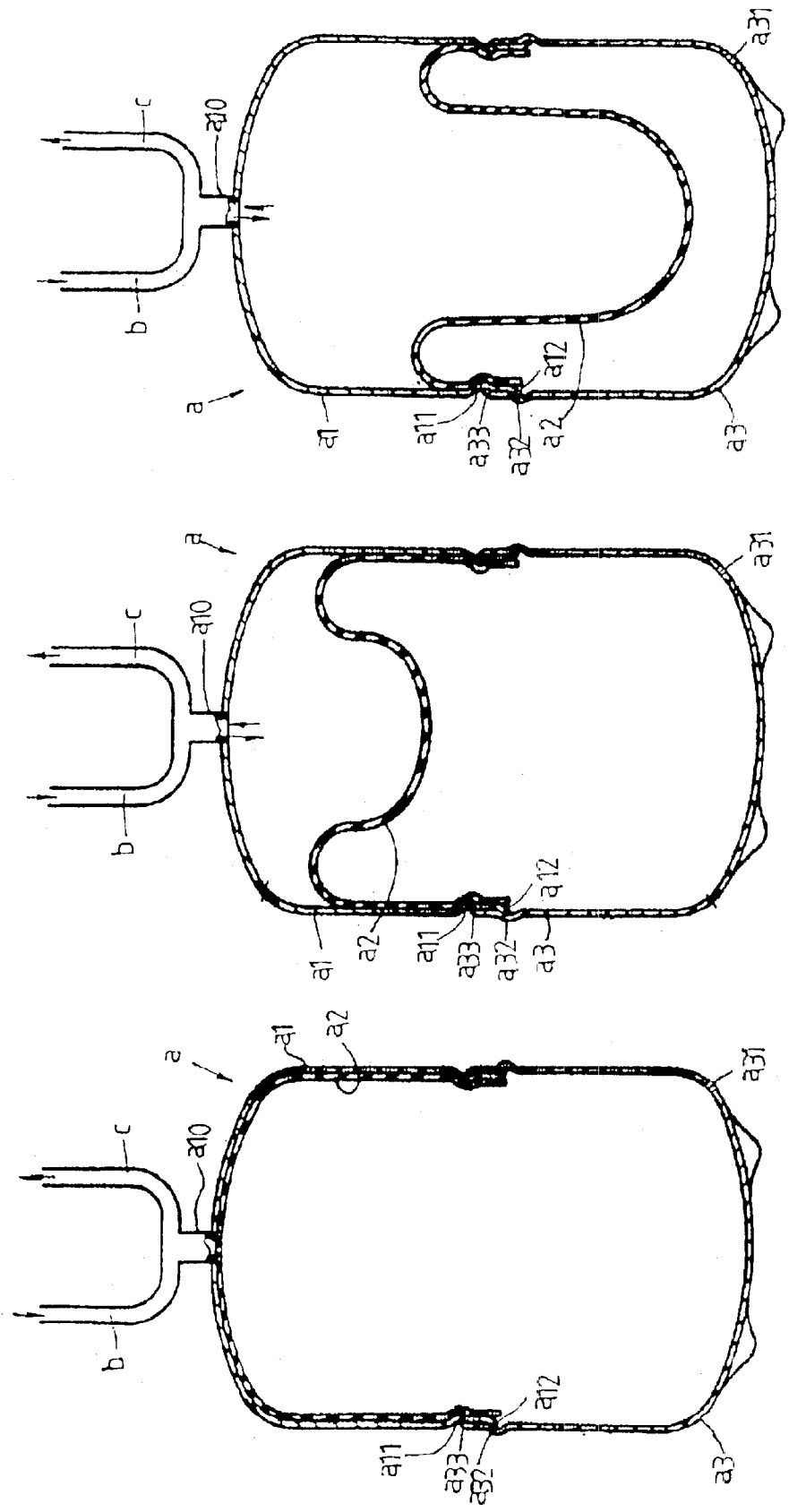

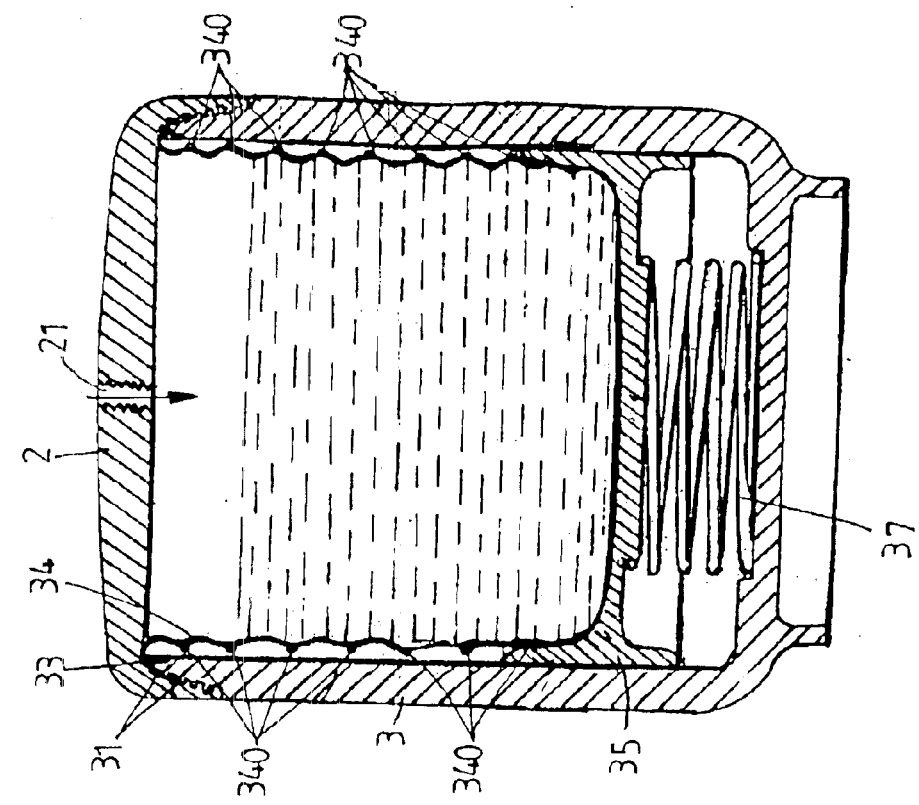
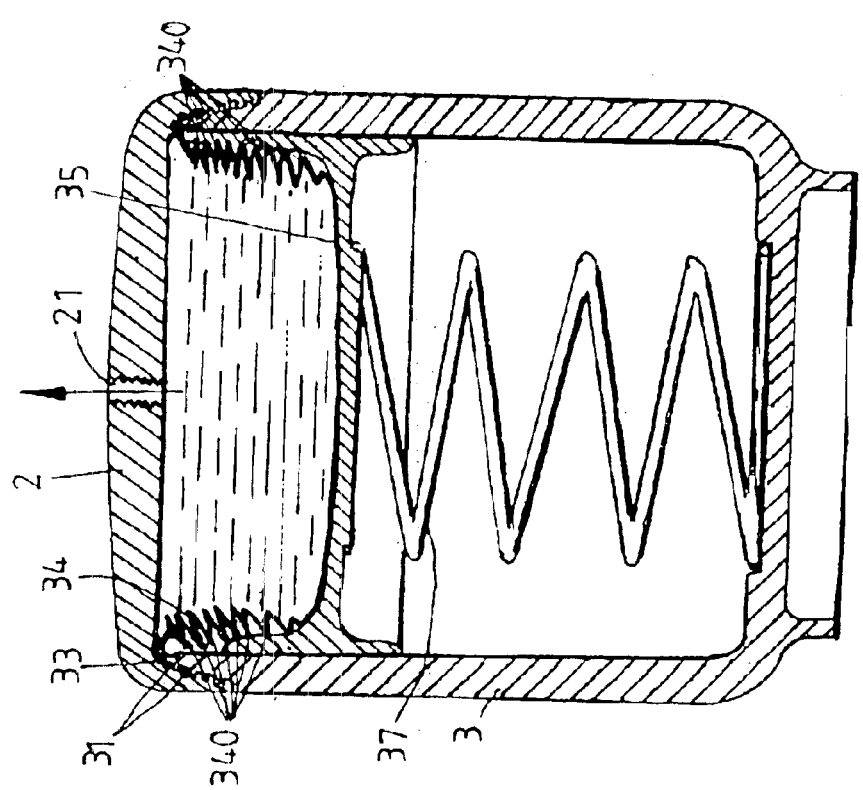

US 6,880,578 B2

PRESSURE-STABLE CYLINDER

FIELD OF THE INVENTION

The present invention relates to pressure-stable cylinders, and particularly to a pressure-stable cylinder which can be operated steadily.

BACKGROUND OF THE INVENTION

Referring to FIGS. 1 and 2, a prior art reverse osmosis pressurized cylinder is illustrated. The pressurized cylinder is formed by an upper cover 11, a lower seat 12, a buckling ring 13 and an inflation isolating film 14.

The upper cover 11 and lower seat 12 are made of plastics or metals. The interiors of the upper cover 11 and lower seat 12 are concave. An openings of the upper cover 11 and lower seat 12 are formed with flanges 111, 121. A top of the upper cover 11 is formed with a water inlet 112 for be connected to the water inlet valve (not shown). An inner side near the opening of the upper cover 11 has a concave wedge surface 113.

A lower end of the lower seat 12 is installed with an air inflation mouth 122 for assembling an air inflation valve. An edge of the opening of the lower seat 12 is flat.

The buckling ring 13 is a T shape cross section. Before combining the upper cover 11 and lower seat 12, an flange 131 of the buckling ring 13 and the lower end 141 of the inflation isolating film 14 are placed on the concave wedge surface 113 of the upper cover 11.

Thereby, when the lower seat 12 is aligned to the upper cover 11, after high speed rotation and compressing, the two are melt so as to combine as an integral body. Then the buckling ring 13 and the inflation isolating film 14 are embedded into the upper cover 11 and lower seat 12. Thus the interior of the pressurized cylinder is divided into a water storage chamber I and an air inflation chamber II. The lower seat 12 is connected to the air inflation valve for inflating air into the air inflation chamber II so that the air inflation chamber II has a predetermined pressure. When external pressure of the water inlet valve is larger than the interior pressure of the air inflation chamber II, the water inlet valve will guide water into the water storage chamber I. The inflation isolating film 14 is pressed downward so that the volume of the air inflation chamber II is reduced. When a user opens a faucet, the pressure of the water inlet valve is reduced, and the inflation isolating film 14 is ejected upwards due to the pressure of the air inflation chamber II. Thereby, water can flow out so as to achieve the objects of storing water and outputting water by pressure.

Above mentioned prior art has the following defects:

The buckling ring is necessary so as to increase cost in material and manufacturing.

The buckling ring 13 can not retain in a tight contact with the inflation isolating film 14 when the upper cover 11 is coupled to the lower seat 12. Thereby, water and air possibly drain out.

When water in the reverse osmosis pressurized cylinder is in full level, the air inflation chamber II below the inflation isolating film 14 has a larger pressure. Thereby, air in the air inflation chamber II possibly vents out so that the pressure of the air inflation chamber II is insufficient. Thereby, the air inflation chamber II must be inflated through an air inflation hole 122 when the reverse osmosis pressurized cylinder is used for a long time so as to retain the pressure in a predetermined value.

In the reverse osmosis pressurized cylinder, the upper cover 11 and lower seat 12 are combined by an un-detached way. Therefore, it is impossible to clean and maintain the pressurized cylinder and to update the parts of the pressurized cylinder.

Moreover, to reduce water hammer in the high pressure pipeline, a pressure-stable cylinder is provided, which has the function of buffering and stabling water. Referring to FIG. 3, in general, the pressure-stable cylinder is installed at the pipeline or a lower side of the pipeline. A through hole of the pressure-stable cylinder is connected to the pipeline. The buffering effect of the pressure-stable cylinder can prevent water hammer. The structure of the pressure-stable cylinder is approximately identical to that of the reverse osmosis pressurized cylinder. The difference of the two is that the through hole of the pressure-stable cylinder is larger than water inlet of the reverse osmosis pressurized cylinder, and thus the pressure of the air inflation chamber is larger than that of the reverse osmosis pressurized cylinder.

The pressure-stable cylinder a includes an outer cylinder 1a with a through hole a10 at a top thereof. The through hole a10 is connected to a water inlet tube b and a water outlet tube c. The outer cylinder 1a has an upper groove a11 and an upper flange a12.

A film a2 is made of elastic plastic material and is placed in the outer cylinder a1. The opening of the film is connected to an inner lateral surface of the outer cylinder a1.

A lower cover a3 has an opening slightly larger than that of the outer cylinder a1. The lower cover a3 has an air inflation mouth a31, a lower groove a32, a lower flange a33 for engaging the outer cylinder a1 and lower cover a3. Thereby, the upper flange a12 is buckled to the lower groove a32 and the lower flange a33 is buckled to the outer cylinder a1, as shown in FIGS. 4 and 5.

In this prior art pressure-stable cylinder, since many parts are used, which are made singly so that air easily drains out so that the function of buffering water pressure is lost. Thereby, the pressure-stable cylinder is made of metal. If it is used for a long time, it easily rusts so that the air pressure is insufficient and thus the buffering function is lost.

SUMMARY OF THE INVENTION

Accordingly, the primary object of the present invention is to provide a pressure-stable cylinder which comprises a cover having a dome shape groove and a through hole; an inner wall of the dome shape groove having threads; a cylinder having an opening and an opening section around the opening having a threaded tapered shape matching to the dome shape groove of the cover; the opening section of the cylinder being formed with a plurality of first washers; one end of the opening section having a coupling groove and a second washer; the washers have the effect of air-tightness and convenience of detaching and separation for maintenance; a bellow coupled to the second washer; a disk placed below the bellow; and a compressible spring placed between the disk and a bottom of the cylinder; the compressible spring resisting against the disk so that the cylinder has a predetermined pressure.

The various objects and advantages of the present invention will be more readily understood from the following detailed description when read in conjunction with the appended drawing.

BRIEF DESCRIPTION OF THE DRAWINGS

FIG. 2 is a cross section view of the prior art reverse osmosis pressurized cylinder.

FIG. 3 is a schematic view of the prior art reverse osmosis pressurized cylinder.

FIG. 4 is a schematic view showing that in lower water pressure, the isolating film of the prior art reverse osmosis pressurized cylinder moves downward and thus expanded to enlarge a water storage space.

FIG. 5 is a schematic view showing that in high water pressure, the isolating film of the prior art reverse osmosis pressurized cylinder moves downward and thus expanded to enlarge a water storage space.

FIG. 11 is a schematic view showing that the compressible spring resists against the cylinder.

FIG. 12 is a schematic view showing that the compressible spring is compressed to a lower side of the cylinder.

DETAILED DESCRIPTION OF THE PREFERRED EMBODIMENTS

Figure 1:
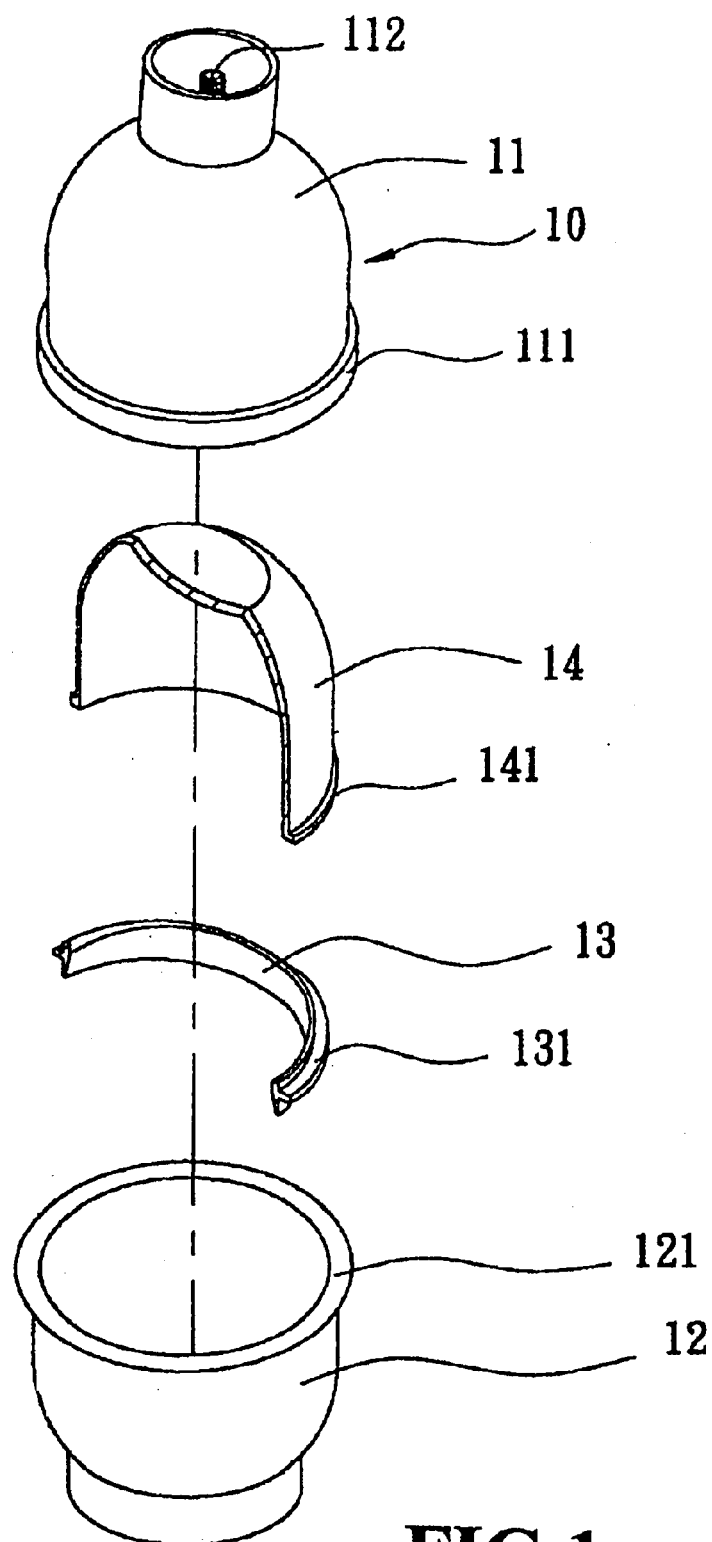
FIG. 1 is the exploded perspective view of the prior art reverse osmosis pressurized cylinder.
Figure 6:
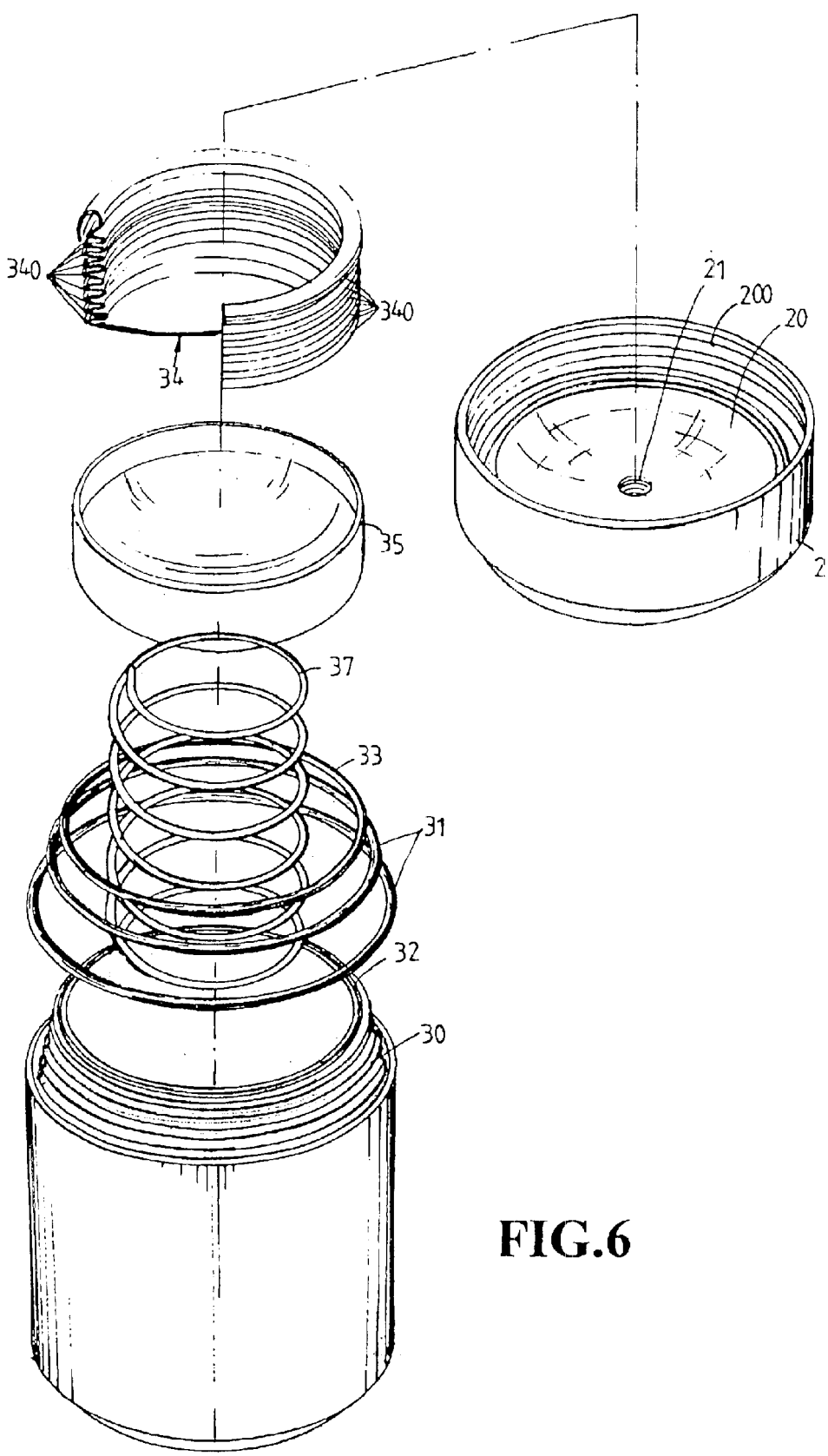
FIG. 6 is an exploded perspective view of the present invention.
Figure 7:
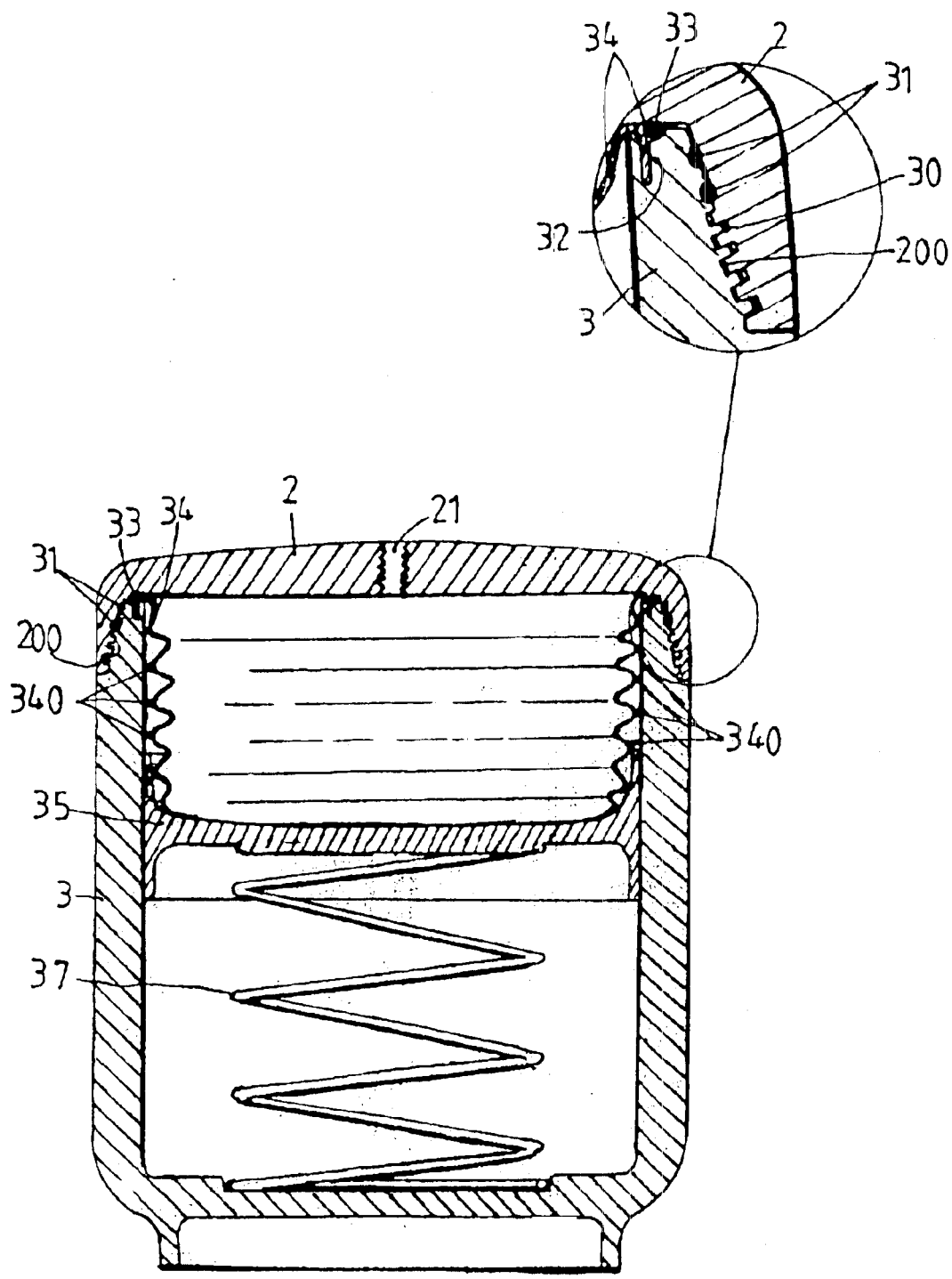
FIG. 7 is an assembled cross section view of the present invention.

Referring to FIGS. 6 and 7, the pressure-stable cylinder of the present invention is illustrated. The pressure-stable cylinder comprises a cover 2 and a cylinder 3.

The cover 2 has a dome shape groove 20 and a through hole 21. An inner wall of the dome shape groove 20 has threads 200.

The cylinder 3 has an opening. An opening section of the cylinder 3 has a threaded tapered shape matching to the dome shape groove 20 of the cover 2. The opening section of the cylinder 3 is formed with a plurality of washers 31. The end of the opening section has a coupling groove 32 and a washer 33 for coupling a telescopic bellow 34. The washers 31, 33 have the effect of air-tightness and convenience of detaching and separation for maintenance. A plurality of stepped sections 30 are formed around the opening section for receiving the washers 31, 33.

Figure 8:
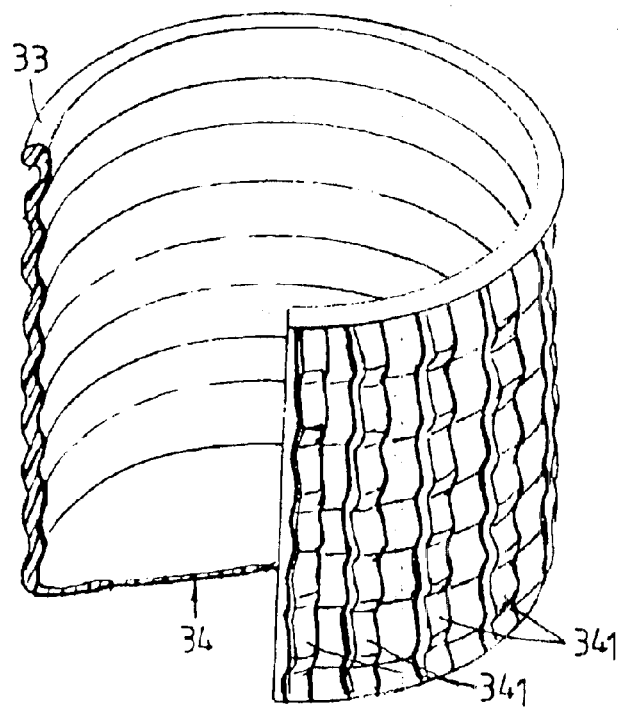
FIG. 8 is a perspective view showing the strips of the bellow of the present invention.

An outer wall of the bellow 34 is formed with strips which can be helical threads or a plurality of round flange 340 or a plurality of axial strips 341 (see FIG. 8). The strips 340 or 341 can be helical thread or a plurality of round strips.

A disk 35 is placed below the bellow 34. A cross section view of the disk 35 has an "H" shape. Two sides of the "H" shape resists against the wall of the cylinder 3. A lower side of the bellow 34 is in the two sides of the disk 35. Thereby, the disk 35 can be steadily adhered to the cylinder 3 and moves along the inner wall of the cylinder 3 steadily.

A compressible spring 37 is placed between the disk 35 and a bottom of the cylinder 3. The compressible spring 37 resists against the disk 35 so that the cylinder 3 has a predetermined pressure.

By the isolating effect of the strips 340 or 341, when the bellow 34 is straightened, an outer wall thereof will not wholly adhere to an inner wall of the cylinder 3. Thereby, when outputting water, the compressible spring 37 will eject the bellow 34 so that the bellow 34 will move upwards.

Figure 9:
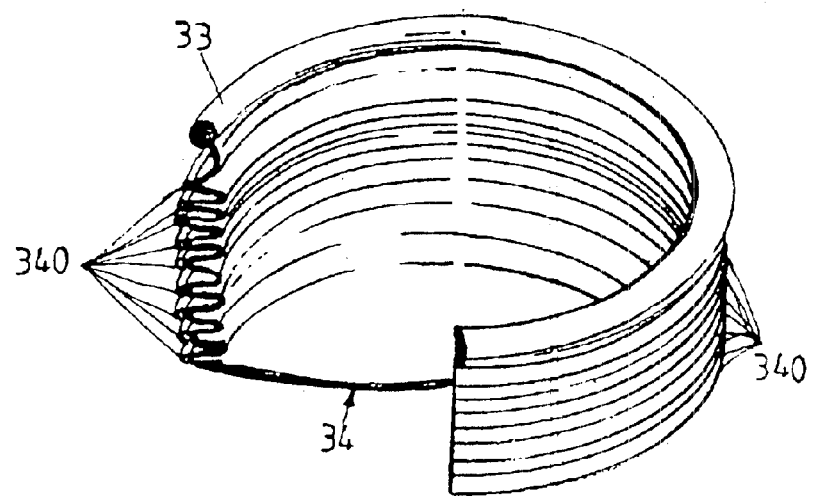
FIG. 9 is a perspective view showing the integrally formed bellow and the washer according to the present invention.
Figure 10:
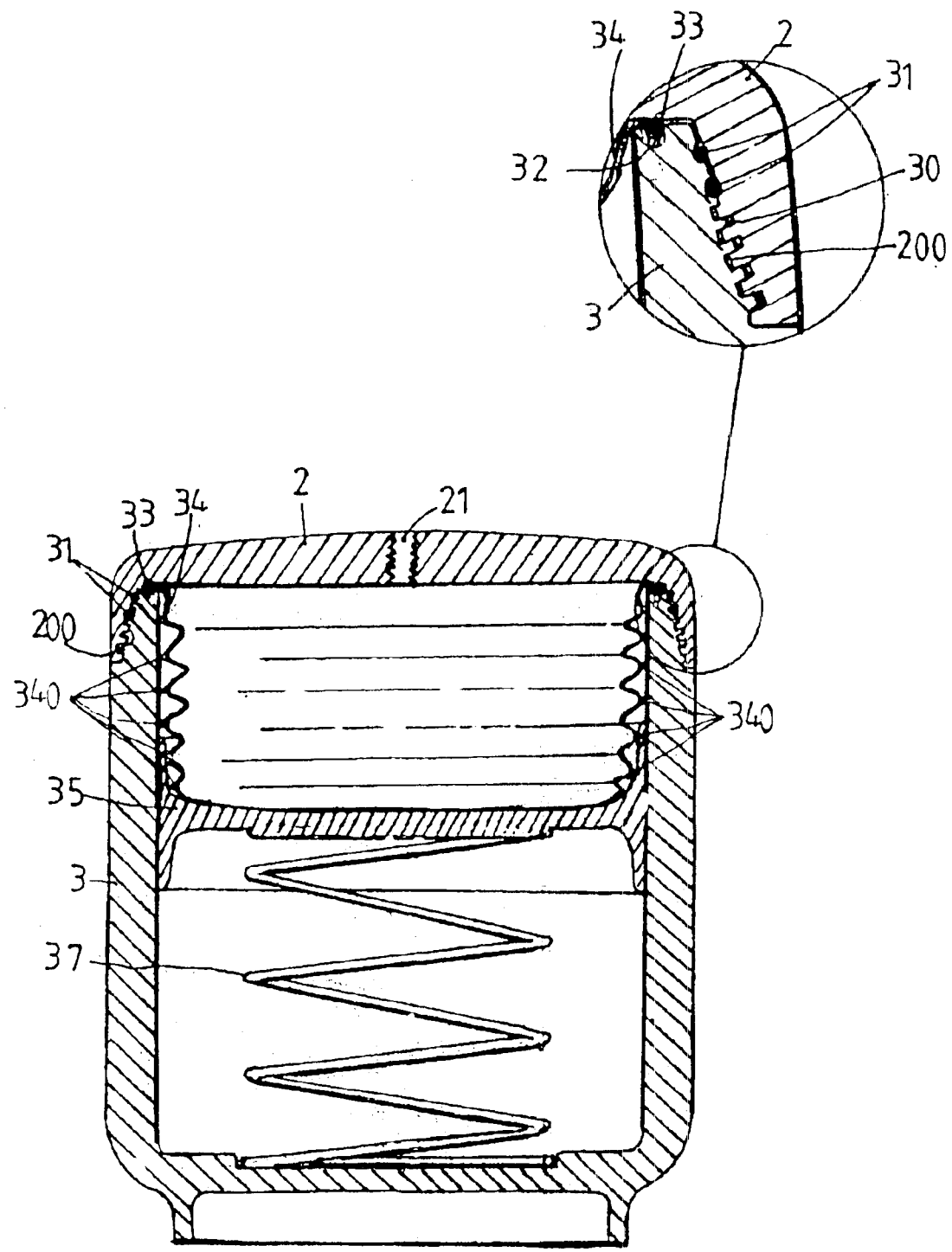
FIG. 10 is a schematic cross section view showing the bellow is engaged to the cover after the bellow is integrally formed with the washer.

In the present invention, the washer 33 and the bellow 34 can be integral formed, as shown in FIG. 9. By the washer 33 to be buckled in the coupling groove 32, the dome shape groove 20 and cylinder 3 are threadedly connected. Then the bellow 34 is steadily fixed to the cylinder 3, as shown in FIG. 10.

Referring to FIGS. 11 and 12, in assembly, the washer 33 and the bellow 34 are steadily fixed to the coupling groove 32 of the cylinder 3. By the thread-connection of the cover 2 and the cylinder 3, the washers 1, 33 have the effect of draining-proof and air-tightness.

When the water in the bellow 34 becomes less, the compressible spring 37 will eject the disk 35 so that the bellow 34 returns to the original condition until an external pressure of an auto-water inlet valve (not shown) is larger than pressure in the cylinder 3 (i.e., the restoring force of the compressible spring 37 and the weight of water in the cylinder 3), the bellow 34 gives a pressure to the compressible spring 37 so that the compressible spring 37 is compressed. Thereby, the pressure in the cylinder 3 is increased to a value larger than that of the valve, the valve stops.

When the structure of the present invention is applied to a high pressure pipeline system, water flow into the cylinder 3 from the through hole 21 of the cover 2. The water is buffered by the compressible spring 37. Thereby, water hammer in the high pressure pipeline system is removed.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A pressure-stable cylinder comprising:
   a cover having a dome shape groove and a through hole; an inner wall of the dome shape groove having threads;
   a cylinder having an opening and an opening section around the opening having a threaded tapered shape matching to the dome shape groove of the cover; the opening section of the cylinder being formed with a plurality of first washers; one end of the opening section having a coupling groove and a second washer;
   a bellow coupled to the second washer;
   a disk placed below the bellow; and
   a compresible spring placed between the disk and a bottom of the cylinder; the compressible spring resisting against the disk so that the cylinder has a predetermined pressure;
   wherein in assembly, the second washer and the bellow are steadily fixed to the coupling groove of the cylinder; by the thread-connection of the cover and the cylinder, the washers have an effect of draining-proof and air-tightness.

2. The pressure-stable cylinder as claimed in claim 1, wherein the second washer is integrally formed with the bellow.

3. The pressure-stable cylinder as claimed in claim 1, wherein an outer wall of the bellow is formed with strips for preventing an outer wall of the bellow to wholly adhere to an inner wall of the cylinder so as to reduce the friction therebetween.

4. The pressure-stable cylinder as claimed in claim 3, wherein the strips are one of helical threads, a plurality of round flanges, and a plurality of axial strips.

* * * * *